(12) United States Patent  
Moller

(10) Patent No.: US 9,785,960 B2  
(45) Date of Patent: Oct. 10, 2017

(54) METHOD AND SYSTEM FOR INCENTIVIZING REAL-WORLD INTERACTIONS FOR ONLINE USERS

(71) Applicant: WeMeet, Rungsted Kyst (DK)

(72) Inventor: Gunnar Moller, Rungsted Kyst (DK)

(73) Assignee: WEMEET, Rungsted Kyst (DK)

( * ) Notice: Subject to any disclaimer, the term of this patent is extended or adjusted under 35 U.S.C. 154(b) by 273 days.

(21) Appl. No.: 14/510,957

(22) Filed: Oct. 9, 2014

(65) Prior Publication Data

US 2015/0112747 A1     Apr. 23, 2015

Related U.S. Application Data

(60) Provisional application No. 61/894,352, filed on Oct. 22, 2013.

(51) Int. Cl.
| | | |
|---|---|---|
| *G06Q 30/02* | (2012.01) | |
| *G06Q 10/10* | (2012.01) | |
| *G06Q 50/00* | (2012.01) | |

(52) U.S. Cl.
CPC ..... *G06Q 30/0231* (2013.01); *G06Q 10/1095* (2013.01); *G06Q 50/01* (2013.01)

(58) Field of Classification Search
USPC ......................................................... 705/7.19
See application file for complete search history.

(56) References Cited

U.S. PATENT DOCUMENTS

| | | | | |
|---|---|---|---|---|
| 2013/0080239 A1* | 3/2013 | Okerlund | ........... | G06Q 30/0226 705/14.33 |
| 2013/0080262 A1* | 3/2013 | Scott | ................... | G06Q 10/109 705/14.68 |
| 2014/0156645 A1* | 6/2014 | Brust | ................ | G06F 17/30554 707/722 |
| 2014/0278845 A1* | 9/2014 | Teiser | ................ | G06Q 30/0241 705/14.4 |

* cited by examiner

*Primary Examiner* — Thomas L Mansfield, Jr.

(74) *Attorney, Agent, or Firm* — Perkins Coie LLP

(57) ABSTRACT

Introduced herein is a method and system that enhances the number of real world meetings between online friends of social networking sites (SNS). The method and system is configured to work in perfect alignment with one or more SNS. The method and system provides an incentive for users who are connected on the SNS to meet in the real world. The incentive is provided through a dynamic meeting platform system that allows third party sponsors to work with SNS to reward users for real-world meetings. By increasing the frequency of meeting between the users, the method and system creates greater alignment between the online social life and conduct and the real-world social life and conduct, increasing the quality of life for the users. Further, such greater alignment helps expand the growth of SNS.

19 Claims, 8 Drawing Sheets

US 9,785,960 B2

METHOD AND SYSTEM FOR INCENTIVIZING REAL-WORLD INTERACTIONS FOR ONLINE USERS

CLAIM OF PRIORITY

This application claims the benefit of U.S. Provisional Patent Application No. 61/894,352, filed Oct. 22, 2013, entitled "METHOD AND SYSTEM FOR INCENTIVIZING REAL-WORLD INTERACTIONS FOR ONLINE USERS," which is expressly incorporated by reference herein.

BACKGROUND

Social networking sites (hereinafter, "SNS") have created many platforms that allow hundreds of millions of people to share and connect with one another. The underlying and dominant premise of these SNS has been that the more people share online with one another, the happier and more fulfilled people will become. Recent studies, however, have challenged this premise with findings that indicate there is a misalignment between an individual's online social life and conduct and the individual's real-world social life and conduct. One study, for example, finds that SNS enable an "oversharing" of intimate moments, where the oversharing results in a diminution of the intimacy itself, creates isolation, and even damages individual relationships.

No technological infrastructures exist to systematically enhance the frequency of real world meetings for users of SNS. The misalignment between social life online and in the real world continues to be an exacerbating problem. Therefore, there is a need to provide a better solution for people to connect and maintain online relationships in the real-world setting through face-to-face meetings.

BRIEF DESCRIPTION OF DRAWINGS

One or more embodiments of the present invention are illustrated by way of example and are not limited by the figures of the accompanying drawings, in which like references indicate similar elements.

DETAILED DESCRIPTION

Introduced herein is a method and system that enhances the number of real world meetings between online friends of social networking websites (SNS). The method and system is configured to work in perfect alignment with one or more SNS. The method and system provides an incentive for users who are connected on the SNS to meet in the real world. The incentive is provided through a dynamic meeting platform system that allows third party sponsors to work with SNS to reward users for real-world meetings. By increasing the frequency of meeting between the users, the method and system creates greater alignment between the online social life and conduct and the real-world social life and conduct, increasing the quality of life for the users. Further, such greater alignment helps expand the growth of SNS.

The technique introduced herein creates a personal value for two or more online users, who are "friends" within one or more SNS, to meet in the real world. In particular, the personal value is generated via the dynamic meeting system. The system connects the users of one or more SNS with one or more sponsoring companies. Such connection enables a commercial value to be added to all participants of the system. The commercial value is introduced by allowing one or more companies to connect with the users via the SNS and to sponsor the real-world meetings of the users. In exchange for participating in a real-world meeting, each online user receives tangible incentives from the sponsoring company. In turn, the sponsoring company receives an exclusive, targeted opportunity to advertise to the users. Further, the SNS itself receives a new income stream from the sponsoring company for allowing sponsorship to be integrated within the SNS platform system.

The technique introduced herein provides a commercial evaluation tool to measure and determine an appropriate marketing strategy to implement the meeting sponsorship. The commercial evaluation tool may be implemented on the SNS platform system or it may be a standalone system integrated with the SNS platform system. The commercial evaluation tool analyzes the relationships between two or more users who may want to meet in the real-world. The tool generates a point system based on the analysis to provide incentives for the users to participate in a real-world meeting. The point system generates and stores points earned by the users for the real-world meetings. These points may be utilized at a number of participating outlets, such as a venue in which a sponsoring company is present (e.g., a café within a shopping mall venue).

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

Figure 1:
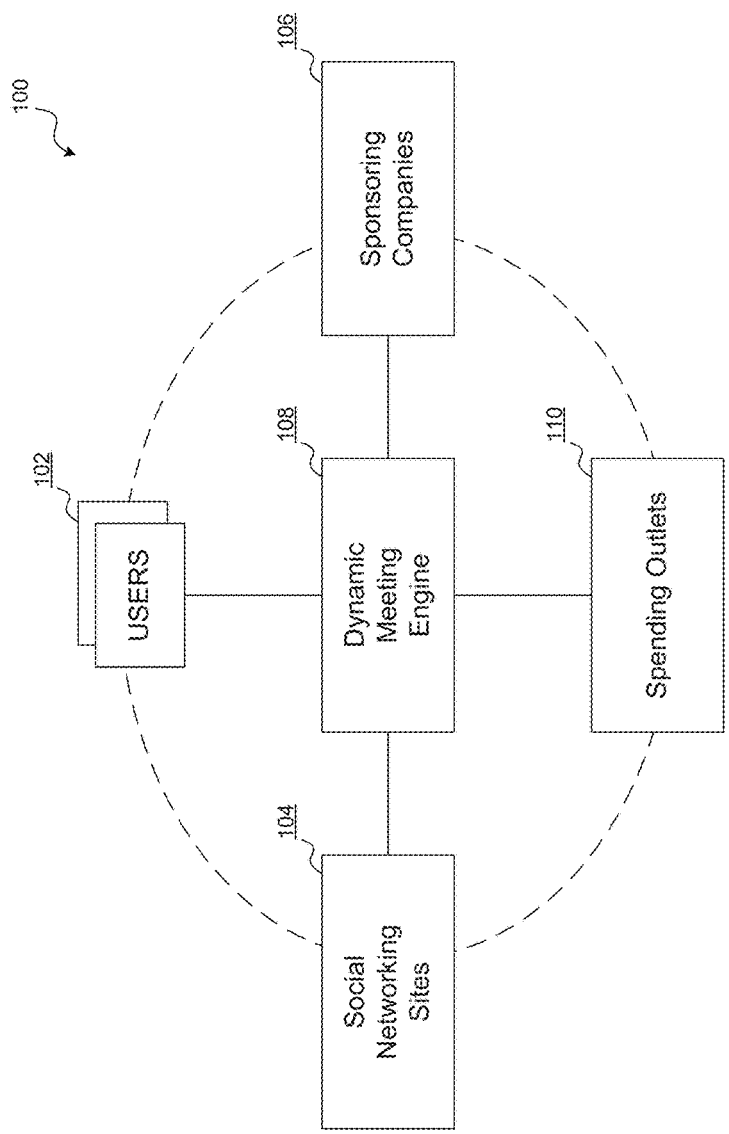
FIG. 1 illustrates an environment in which a dynamic meeting engine may be utilized.

FIG. 1 illustrates an environment 100 in which a dynamic meeting platform may be utilized. The environment 100 includes two or more users 102, one or more social networking sites (SNS) 104, one or more sponsoring company systems 106, and a dynamic meeting engine 108. The users 102, the SNS 104, the sponsoring company systems 106, and the dynamic meeting engine 108 connect with one another via a network (not shown).

The users 102 are users of one or more SNS. The users 102 may connect to the SNS via the network by using a user device, such as a mobile phone (e.g., Android® enabled phone), a portable desk assistant (PDA), or a personal computer. The users 102 have one or more accounts with one or more SNS 104. When two particular users 102 are connected within the same SNS 104, they may have an online social relationship that never gets actualized in a real-world setting. As will be discussed in further details below, the dynamic platform system 108 generates particular opportunities for the users 102 to connect online and to participate in a real-world meeting.

The SNS 104 includes any social networking platform system that allows one or more users 102 to connect within an online community. An SNS includes, for example, Facebook®, LinkedIn®, Google+®, Twitter®, and the like. The one or more sponsoring company systems 106 ("sponsoring systems") include any computing system which businesses utilize to execute and maintain their marketing campaigns. The sponsoring system may be a standalone system that is operated by a particular business. The sponsoring system may also be an online portal, offered by a third party, through which a particular business may utilize to execute and maintain its marketing campaigns.

The dynamic meeting engine 108 integrates the users 102, the SNS 104, and the sponsoring system 106. The engine 108 may be operable when executed by a processor or other computing device, e.g., a single board chip, application specific integrated circuit, a field programmable field array, a network capable computing device, a virtual machine terminal device, a cloud-based computing terminal device, or any combination thereof. In one embodiment, the engine 108 is a mobile application that is executed on a smartphone (e.g., an iPhone®). In one embodiment, the engine 108 is a standalone system that provides an application programming interface (API) through which the users 102, the SNS 104, and the sponsoring systems 106. In one embodiment, the engine 108 may be incorporated, developed, and operated by a particular SNS participating.

Figure 2:
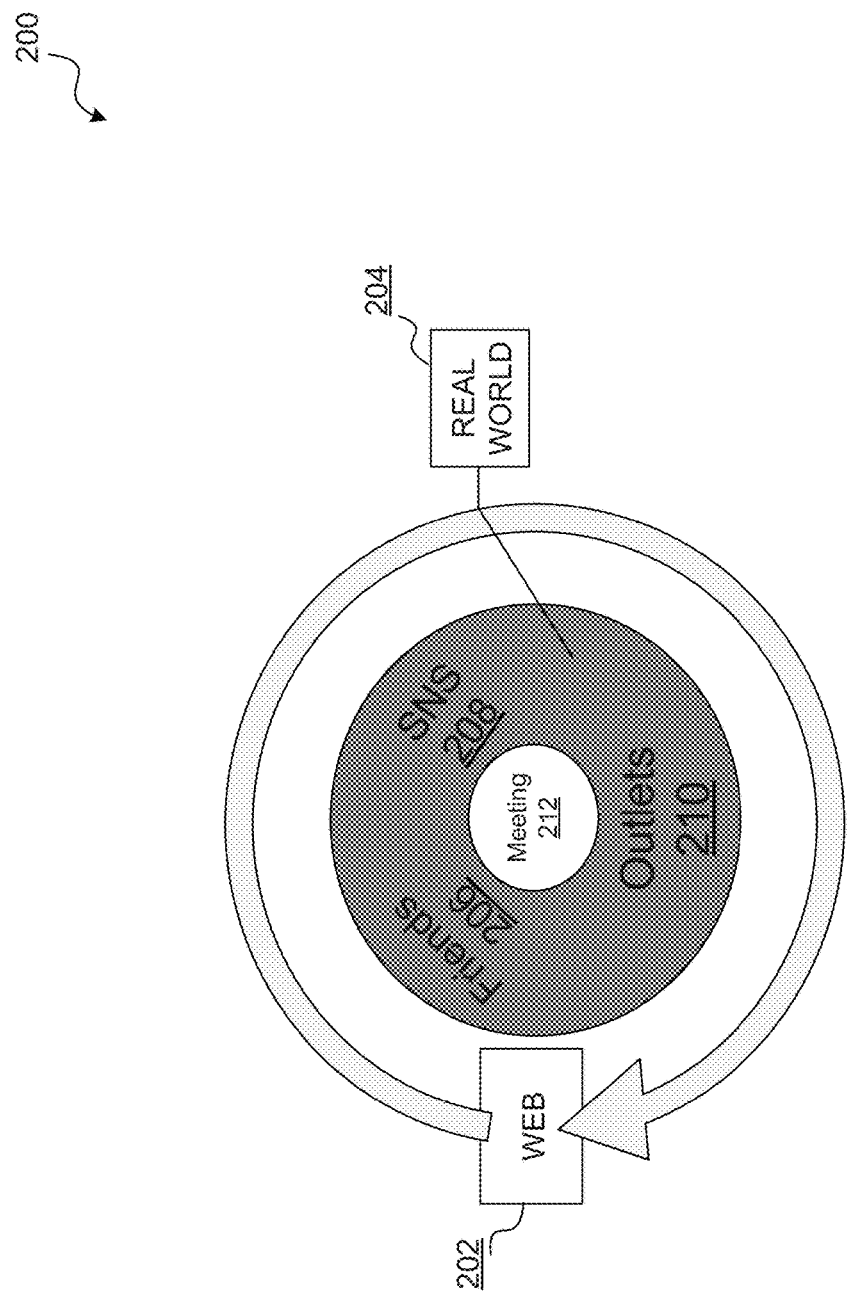
FIG. 2 illustrates the dynamics of user interactions between a web environment and a real-world environment that are enabled by a dynamic meeting platform.

FIG. 2 illustrates the dynamics 200 of user interactions between a web environment 202 and a real-world environment 204 that are enabled by a dynamic meeting platform. The dynamic meeting platform may be the dynamic meeting engine 108 of FIG. 1. The dynamics involve "friends" 206, one or more SNS 208, and one or more outlets 210 that enable the friends to have interactions interweaving between the web 202 (i.e., online world) and the real world 204. As used herein, the term "friends" refers to two or more users who are connected online via a particular SNS 208. The friends 206 may have certain relationships via the web by being connected on the SNS 208, and may not have any actual relationship in the real world 204. As used herein, the term "outlet" refers to a physical meeting place at which sponsoring companies can physically be present to provide sponsorship as an incentive for the friends 206 to connect in the real world 204.

Through the dynamic meeting platform, a particular sponsoring company may advertise on the SNS 208 to allow the friends 206 to set up a meeting in the real world 204. The sponsoring company provides a reward incentive that takes place (in the real-world) at a particular venue at which the sponsoring company has a physical presence. By being integrated with the SNS 208, the dynamic meeting platform allows the sponsoring company to analyze the friends on the web 202 and provide targeted advertisements that would increase the chance of the friends meeting in the real world 204.

In one embodiment, the sponsorship meetings will only take place at certain outlets. The sponsoring companies are introduced to the users in phases. For example, in an implementation phase, or a "first phase," the sponsoring companies include only restaurants, cafes, cinemas, and fast food chains. In a second phase, the sponsoring companies may further include other company types that are atypical (i.e., types that are not easy for a user to grasp), such as a skydiving company, a nightclub, a bar etc.

In one embodiment, the dynamic meeting platform allows the SNS 208 to configure restrictions associated with the incentives being offered by the sponsoring company. In one embodiment, a particular user is restricted access to the system based on a duration of membership time with the SNS. For example, the user may be required to have a membership with the SNS for a predefined period of time before any incentive is presented to the user or before the user actually gets presented to the sponsoring company for analysis. In one embodiment, this predefined period may be specified by the sponsoring company.

Figure 3:
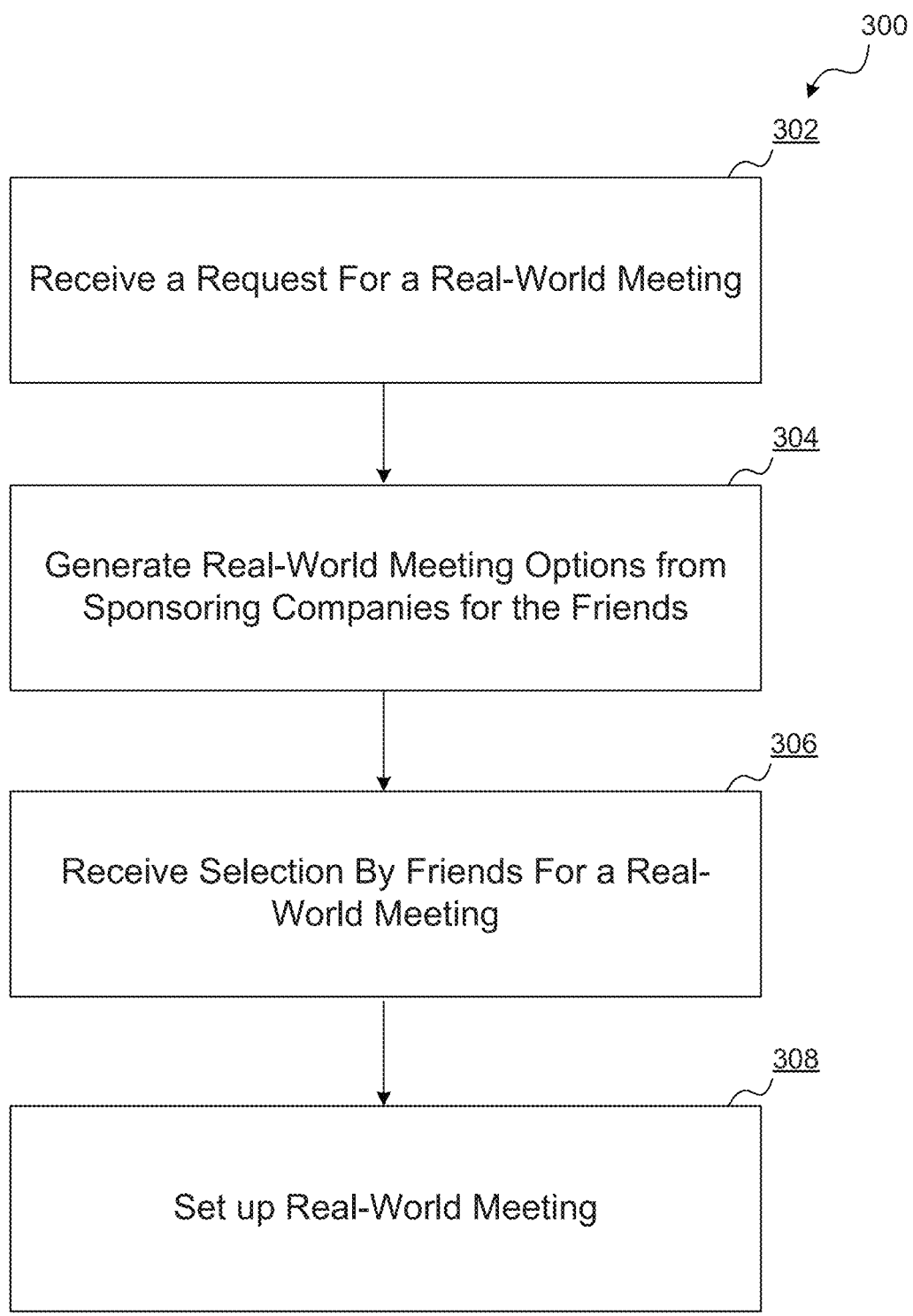
FIG. 3 illustrates a method for setting up a real-world meeting for online users of a particular SNS.

FIG. 3 illustrates a method 300 for setting up a real-world meeting for online users of a particular SNS. The online users may be existing friends on the SNS, such as two Facebook® users who are socially connected in the online world. The process 300 may be implemented by the dynamic meeting platform discussed in the description of FIG. 2, or the dynamic meeting engine 108 of FIG. 1.

At step 302, the dynamic meeting engine receives a request for a real-world meeting from two or more users, i.e., friends, having a social relationship on a particular SNS. For example, two friends belonging to Google+® may both log on to their Google+ account and click on a "Face-to-Face Meeting" link. Clicking on the Face-to-Face Meeting link sends a signal to the dynamic meeting engine indicating an agreement between the friends to meet a particular time in the future, such as within a week. The dynamic meeting engine, in response, identifies one or more sponsoring companies that are connected to the SNS and that are interested in sponsoring real-world meetings of users on the SNS. The dynamic meeting engine determines the appropriate sponsoring companies to present to the friends.

At step 304, the dynamic meeting engine generates for the friends one or more real-world meeting options to connect with one another in a real-world setting. For example, the engine may generate pop-up advertisements that appear on a web page of the SNS to alert each of the friends about the real-world meeting offerings from various sponsoring companies. In one embodiment, the points being presented as incentives to attend a real-world meeting may be based on a duration of the relationship between the friends 604, 606.

Figure 4:
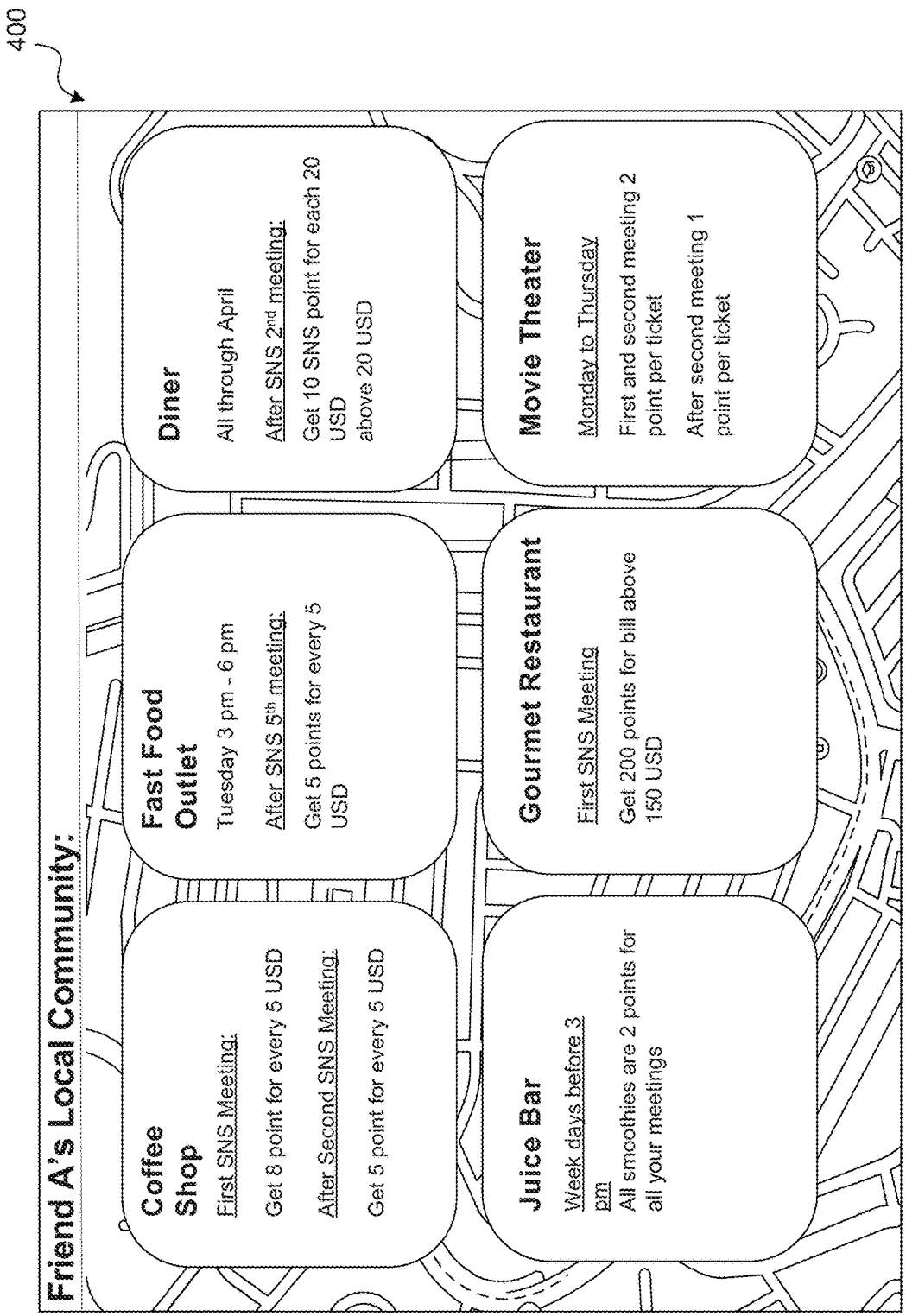
FIG. 4 illustrates an example webpage at which pop-up real-world meeting options 400 are provided for two or more users (or friends) of a SNS

The real-world meeting options are generated for the friends on the SNS platform. Each of the two friends sees the options as pop-up advertisements. Each offering is specific to a meeting between the two users, is sponsored by the same company, and has the same incentives for each user. The offering may include details such as a number of loyalty points for each meeting in the real world. These loyalty points serve, for example, as personal incentive for the two users to actually meet in the real-world. The friends may compare all the offerings from the different sponsoring companies, such as a coffee shop, a fast food company, a pizza chain, a cinema and a local restaurant. FIG. 4 illustrates an example of such offerings.

At step 306, the dynamic meeting engine receives an acceptance of an offer from the two users. Note, the two users must accept the same offer. Further, the offer only comes from a participating outlet. For example, the two friends finally choose to have their meeting at a particular local coffee shop that participates in the dynamic meeting system (as there are many other coffee shops in the local area, but not all participate with the SNS, the sponsoring companies, and the dynamic meeting system).

At step 308, the engine sets up the real-world meeting for the users at a particular outlet set out in the offering selected by the users. The particular outlet is a physical meeting place at which a particular sponsoring company associated with the selected offer is physically present. In one embodiment, the outlet is a combination of sponsoring companies, such as a mall having a café, a restaurant, and a bar all sponsoring a real-world meeting. In one embodiment, the outlet is only the café operated by the sponsoring company.

FIG. 4 illustrates an example webpage at which pop-up real-world meeting options, or "offerings", 400 are provided for two or more users (or friends) of a SNS. The pop-up real-world meeting options may be generated by the dynamic meeting engine 108 of FIG. 1. As shown in FIG. 4, the meeting options are generated for a user A, i.e., Friend A, as pop-ups overlaying a neighborhood map. The pop-ups provide a group of outlets, associated with different sponsoring companies, that are available within Friend A's community. Friend A may choose to accept any of the offers provided by agreeing to have a real-world meeting with another friend on the SNS at a particular outlet.

The meeting offerings may be configured by the SNS; that is, the SNS may configure how messages from the sponsoring companies may be displayed to the SNS's users. In one embodiment, pop-up advertisements, as discussed above, from the outlets in the local community of the online friends may be displayed. In one embodiment, the meeting offerings (i.e., incentive advertisements from the sponsoring companies) may be displayed on the left or right margin of the SNS page small advertising offers in the two online friends local community. In one embodiment, the meeting offerings may be contained on a separate page with all advertised meeting offers in the local community of each online friend. Such page can have direct access to an online map.

Figure 5:
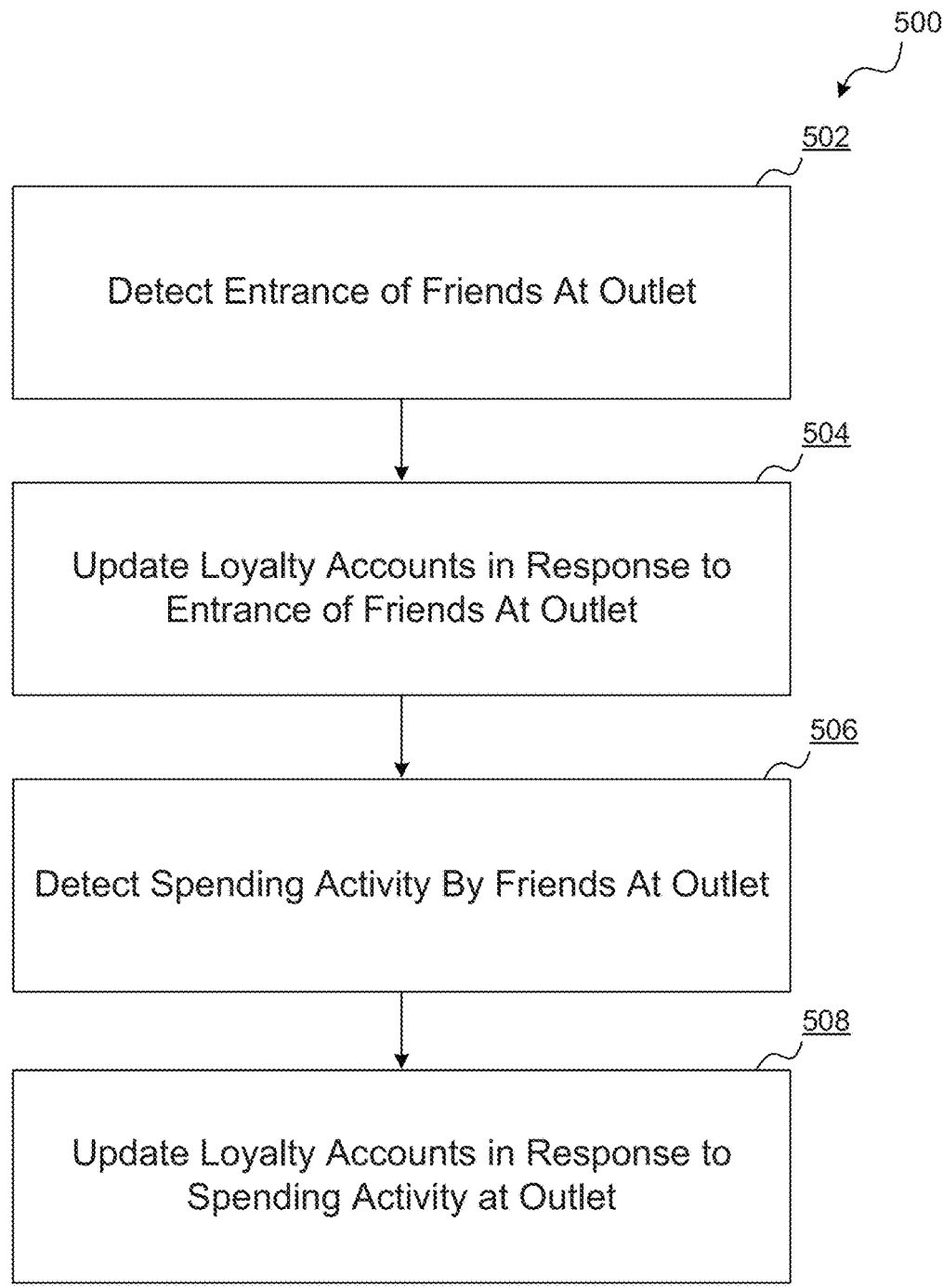
FIG. 5 illustrates a method for tracking real-world meetings of online users of a particular SNS.

FIG. 5 illustrates a method 500 for tracking real-world meetings of online users of a particular SNS. The tracking method 500 may be implemented by the dynamic meeting engine 108 of FIG. 1. At step 502, the engine detects physical entrance of the one or more friends at the outlet associated with the offering accepted online, such as the offer discussed in the description of FIG. 3.

In one embodiment, the detection of the physical presence may be implemented using Bluetooth® technology. For example, the friends' user device (e.g., a smartphone) may sync via Bluetooth® connectivity with a detection system built in at the outlet. In such example, when the friends physically enter the outlet, Bluetooth® detection system detects each friend's smart phone, logs the friend's entrance, and establishes the friend's physical presence at the outlet.

In one embodiment, the detection of the physical presence may be implemented a barcode scanning technology. For example, upon entrance to the outlet, a bar code associated with the outlet is physically present and available for scanning by each friend. In such example, each friend may establish his/her presence by launching a dynamic meeting mobile application on his/her smartphone and scanning the bar code associated with the outlet. The mobile application then proceeds to log the friend's entrance and establish the friend's physical presence at the outlet.

In one embodiment, the physical presence of the friends at the outlet is configured to be established only under certain circumstances. For example, the dynamic meeting engine may be configured to mark existence of the physical presence only if each friend enters the coffee shop together. In another example, the physical presence is established only if a second friend enters the outlet no later than 30 minutes after a first friend has entered.

At step 504, the dynamic meeting engine updates a loyalty account associated with each friend in response to a detection of the friend's entrance at the outlet. In particular, in exchange for actually attending the real-world meeting, loyalty points are added to the friend's loyalty account. In one embodiment, the loyalty points are added when a friend, using his/her mobile device, scans the bar code physically located at the outlet. For example, the user uses his/her smartphone to scan a bar code placed on a table at the outlet. In one embodiment, the loyalty points are added when the Bluetooth® device located at the outlet automatic detects the friend's mobile device.

Throughout the real-world meeting at the outlet, the dynamic meeting engine monitors and detects spending activities of the friends, as indicated in step 506. In one embodiment, when either of the friends spends more than a predefined amount, loyalty points are automatically updated on that friend's loyalty account. In one embodiment, when both friends each spends more than a predefined amount, loyalty points are added. For example, if each friend spends more than $10, then each user will get 2 loyalty points added. In such example, it may be configured that no loyalty points are added if only one of the two users spends more than $10.

Figure 6:
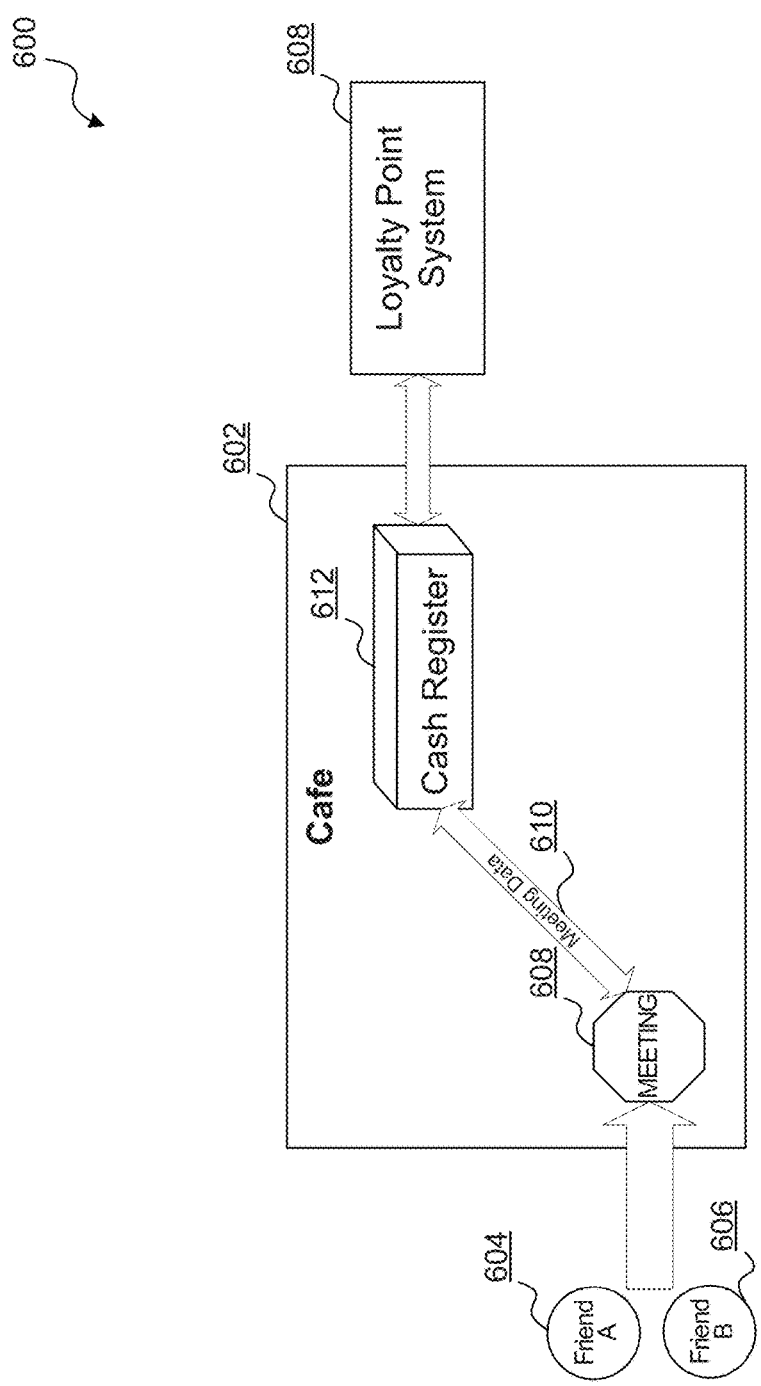
FIG. 6 illustrates a block diagram of a loyalty account implementation environment.

FIG. 6 illustrates a block diagram of a loyalty account implementation environment 600. The loyalty account implementation may be executed by the dynamic engine 108 of FIG. 1. The environment 600 includes a sponsoring company 602, friends 604, 606, and a loyalty point system 608. The sponsoring company 602 may be executed on a sponsoring company system 106 of FIG. 1. In the example illustrated in FIG. 6, the sponsoring company 602 is a café. The friends 604, 606 may be the users 102 of FIG. 1. The loyalty point system 608 may be utilized in conjunction with the process 500 of FIG. 5. The loyalty point system 608 may be a part of a particular SNS in which the friends 604, 606 belong. For example, the loyalty point system includes a loyalty account that is associated, or linked, and maintained with the SNS user account of the friend 604 on the SNS.

Referring to FIG. 6, when the friends 604, 606 physically attend a meeting 608 in the real world, meeting data 610 is transmitted to a cash register 612 associated with the Café 602. The meeting data 610 may include, for example, information related to the friends 604, 606, such as their identity information, their entrance/physical presence information (e.g., time, date, visit frequency), their spending activities at the Café, etc.

The loyalty point system 608 may be utilized by the dynamic meeting engine to evaluate and generate an appropriate loyalty point system for the friends 604, 606 and to maintain a record of loyalty points associated with the friends 604, 606. In particular, the loyalty point system determines an appropriate loyalty scheme to target a particular online user (i.e., two or more online friends of a SNS) in order to effectively enhance the incentives for those friends to meet in the real world. In one embodiment, the loyalty point system 608 works with the cash register 612 to track the real-world meeting activities of the friends 604, 606. The tracking may be implemented using the meeting data 610 associated with the Café 602. Once a friend (604, 606) completes a real-world meeting, the associated loyalty program of that friend is updated with the appropriate loyalty points. For example, for each real-world meeting, each friend's loyalty account in the loyalty point system 608 gets updated with new loyalty points.

In one embodiment, each meeting will create a unique and one only entity which commercial value will be valuated using a matrix of: (1) No. of meetings between online friends. To provide an extra incentive to meet with new online friends first meeting is set to have most value; and (2) Spending during the meeting.

The loyalty points may be redeemed across multiple participating sponsoring companies. In one embodiment, the loyalty points may be redeemed, as cash equivalents, at other participating outlets (i.e., an outlet different from the Café). In one embodiment, the points may be redeemed for other meetings at the same outlet (e.g., the Café). In some embodiments, the points may be redeemed at the same outlet where only one participant is part of the online SNS. For example, friend 604 may use his points, earned from real-world meetings with friend 606, to dine with his father at the Café 602, where the father is not part of the friend's SNS.

Figure 7:
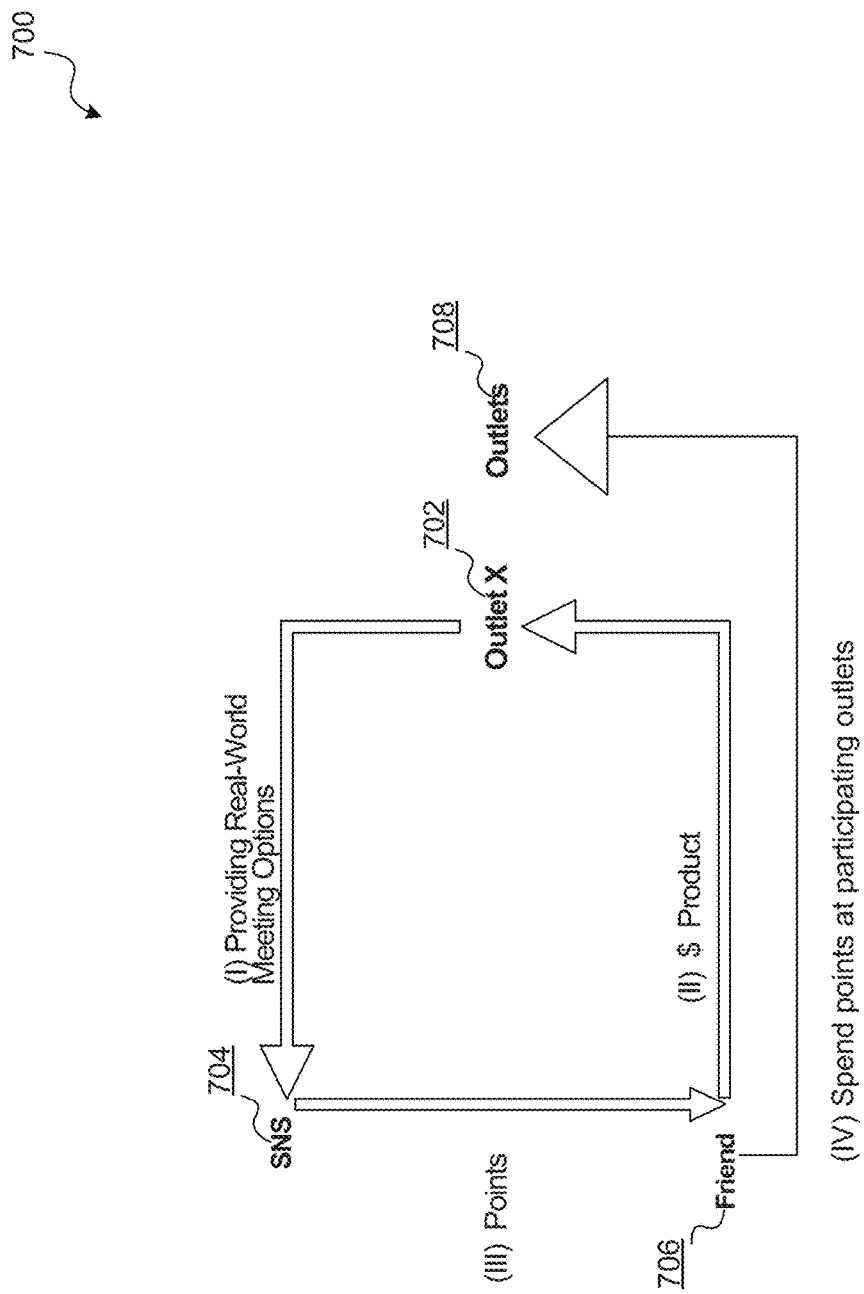
FIG. 7 illustrates a diagram of the benefits generated and facilitated by a dynamic meeting platform between an outlet, a SNS, a friend (or user of the SNS), and other participating outlets.

FIG. 7 illustrates a diagram of the benefits 700 generated and facilitated by a dynamic meeting platform between an outlet 702, an SNS 704, a friend (or user of the SNS) 706, and other participating outlets 708. The dynamic meeting platform enables the outlet 702, which is a sponsoring company, an opportunity to communicate relevant information and provide incentives for the friend(s) of the SNS 704 to meet in the real-world setting. The friend(s) 706 participates in the real-world setting and spends money on products associated with the outlet 702, providing the outlet benefit. The SNS, working with the dynamic meeting platform, maintains and updates loyalty points associated with the friend 706. These points may be redeemed at the outlet 702 again or other participating outlets 708.

Figure 8:
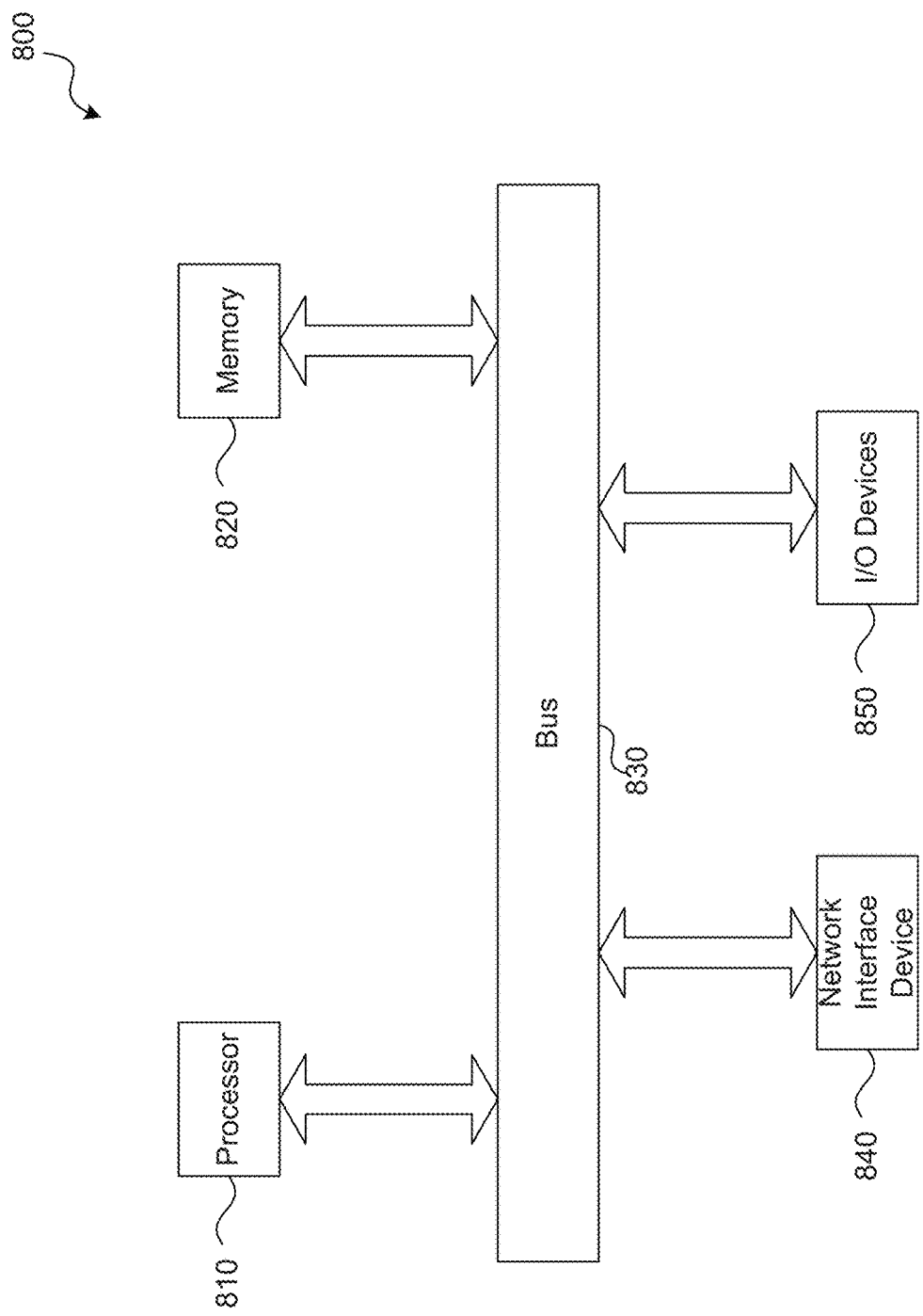
FIG. 8 is a block diagram of an example architecture for a system that may be utilized to implement the techniques described herein.

FIG. 8 is a block diagram of an example architecture for a system 800 that may be utilized to implement the techniques described herein. The system 800 may reside, for example, in the dynamic meeting engine 108 of FIG. 1. In FIG. 8, the system 800 includes one or more processors 810 and memory 820 connected via an interconnect 830. The interconnect 830 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire."

The processor(s) 810 may include central processing units (CPUs) that can execute software or firmware stored in memory 820. The processor(s) 810 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 820 represents any form of memory, such as random access memory (RAM), read-only memory (ROM), flash memory, or a combination of such devices. In use, the memory 820 can contain, among other things, a set of machine instructions which, when executed by processor 810, causes the processor 810 to perform operations to implement embodiments of the present invention.

Also connected to the processor(s) 810 through the interconnect 830 is a network interface device 840. The network interface device 840 provides the system 800 with the ability to communicate with remote devices, and may be, for example, an Ethernet adapter or Fiber Channel adapter.

The system 800 may also include one or more optional input/output devices 850. The input devices may include a keyboard, a mouse or other pointing device. The output devices may include a display device, such as a cathode ray tube (CRT), liquid crystal display (LCD), or some other applicable known or convenient display device.

The invention claimed is:

1. A method of gamification of mobile device check-ins wherein social network members are rewarded non-fiat digital currency for attending calendar events comprising:

generating, by a web server, a calendar event associated with a particular outlet of a plurality of outlets, a particular time, and a plurality of social network user accounts, the calendar event selected by at least one of the plurality of social network user accounts from a list of available calendar events, the list of available calendar events are entered into the web server by the plurality of outlets and each include details other than the particular time and the plurality of social network user accounts, the particular time and the plurality of social network user accounts are generated when the calendar event is selected by the at least one of the plurality of social network users;

assigning, by the web server, a first number of loyalty points to the calendar event, the loyalty points redeemable by the plurality of social network user accounts through the web server for digital coupons, the first number of loyalty points determined based on any of:
a number of social media user accounts included in the plurality of social media user accounts;
an amount one or more users of the plurality of social network user accounts spend at the particular outlet; or
the particular outlet;

transmitting, by a plurality of location-aware mobile devices each associated respectively with the plurality of social network user accounts, notifications to the web server indicating that the plurality of location-aware mobile devices are physically present at the particular outlet, wherein said transmitting the notification is triggered based on any of:
a client application check-in verified by GPS;
each of the plurality of location-aware mobile devices transmitting a code provided on-site at the particular outlet; or
a provided proof of purchase at the particular outlet; and crediting, by the web server, the number of loyalty points to the plurality of social network user accounts.

2. A method of gamification of mobile device check-ins wherein social network members are rewarded non-fiat digital currency for attending calendar events comprising:

generating, by a web server, a calendar event associated with a particular outlet, a particular time, and a plurality of social network user accounts, the calendar event selected by at least one of the plurality of social network user accounts from a list of available calendar events;

assigning, by the web server, a first number of non-fiat digital currency to the calendar event, the non-fiat currency redeemable by the plurality of social network user accounts through the web server for digital coupons;

receiving, by the web server during the particular time, a first notification from a first location-aware mobile device associated with a first social network user account of the plurality of social network user accounts, a second notification from a second location-aware mobile device associated with a second social network user account of the plurality of social network user accounts, the first and second notifications indicating that the first and second location-aware mobile devices are physically present at the particular outlet, wherein a physical presence of the first and second location-aware mobile devices is verified by any of:
a client application check-in verified by GPS;
each of the first and second location-aware mobile devices transmitting a code provided on-site at the particular outlet; or
a provided proof of purchase at the particular outlet;
crediting, by the web server, the first number of non-fiat digital currency to the first and second social network user accounts.

3. The method of claim 2, wherein the digital coupons are associated with a plurality of sponsoring outlets.

4. The method of claim 2, wherein said generating a calendar event further comprises:
determining a means for triggering the first notification and the second notification.

5. The method of claim 4, wherein said means includes at least one of:
a Bluetooth signal associated with the particular outlet;
a bar code signal associated with the particular outlet; or
a GPS signal received from the first and second location-aware mobile devices corresponding to a real-world location of the particular outlet.

6. The method of claim 4, wherein said generating a calendar event further comprises:
monitoring and detecting for purchasing activities of each social network user account at the particular outlet.

7. The method of claim 2, wherein the number of assigned non-fiat digital currency assigned is based on a relationship status between the first and second social media user account.

8. The method of claim 2, further including a number of additional social media user accounts with an associated number of additional location-aware mobile devices in each instance of action taken by the first and second social media user account.

9. The method of claim 8, wherein the number of assigned non-fiat digital currency assigned is based on a total number of location-aware mobile devices providing respective notifications indicating that the that the first and second location-aware mobile devices are physically present at the particular outlet.

10. The method of claim 2, wherein said crediting is further in response to:
users of either of the first or second social media user account spends more than a predefined amount at the particular outlet.

11. A system of gamification of mobile device check-ins wherein social network members are rewarded non-fiat digital currency for attending calendar events comprising:
a web server configured to generate a calendar event associated with a particular outlet, a particular time, and a plurality of social network user accounts, the calendar event selected by at least one of the plurality of social network user accounts from a list of available calendar events, the web server further configured to assign a first number of non-fiat digital currency to the calendar event, the non-fiat currency redeemable by the plurality of social network user accounts through the web server for digital coupons;
a first client application executed on a first mobile device configured to transmit a first notification, the first client application associated with a first social network user account of the plurality of social network user accounts, the first notification indicating that the first mobile device is physically present at the particular outlet, wherein a physical presence of the first mobile device is verified by any of:
a first client application check-in verified by GPS;
transmitting a code provided on-site at the particular outlet; or
a provided proof of purchase at the particular outlet; and
a second client application executed on a second mobile device configured to transmit a second notification, the second client application associated with a second social network user account of the plurality of social network user accounts, the second notification indicating that the second mobile device is physically present at the particular outlet, wherein a physical presence of the second mobile device is verified by any of:
a second client application check-in verified by GPS;
transmitting a code provided on-site at the particular outlet; or
a provided proof of purchase at the particular outlet;
wherein the web server is further configured to crediting the first number of non-fiat digital currency to the first and second social network user accounts in response to the web server receiving the first and second notifications.

12. The system of claim 11, wherein the digital coupons are associated with a plurality of sponsoring outlets.

13. The system of claim 11, wherein generation of the calendar event further includes determining a means for triggering the first notification and the second notification.

14. The system of claim 13, wherein said means includes at least one of:
a Bluetooth signal associated with the particular outlet;
a bar code signal associated with the particular outlet; or
a GPS signal received from the first and second location-aware mobile devices corresponding to a real-world location of the particular outlet.

15. The system of claim 13, wherein generation of the calendar event further includes monitoring and detecting for purchasing activities of each social network user account at the particular outlet.

16. The system of claim 11, wherein the number of assigned non-fiat digital currency assigned is based on a relationship sOtatus between the first and second social media user account.

17. The system of claim 11, further including a number of additional social media user accounts with an associated number of additional location-aware mobile devices in each instance of action taken by the first and second social media user account.

18. The system of claim 17, wherein the number of assigned non-fiat digital currency assigned is based on a total number of location-aware mobile devices providing respective notifications indicating that the that the first and second location-aware mobile devices are physically present at the particular outlet.

19. The system of claim 11, wherein the web server credits the to the first and second social network user accounts further in response to users of either of the first or second social media user account spends more than a predefined amount at the particular outlet.

* * * * *